United States Patent
Suzuki et al.

(10) Patent No.: US 7,511,919 B2
(45) Date of Patent: Mar. 31, 2009

(54) MAGNETIC DISK APPARATUS

(75) Inventors: Kenji Suzuki, Fujisawa (JP); Kouki Uefune, Odawara (JP); Takako Hayakawa, Hiratsuka (JP); Osamu Beppu, Oiso (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 338 days.

(21) Appl. No.: 11/046,485

(22) Filed: Jan. 28, 2005

(65) Prior Publication Data

US 2005/0180047 A1  Aug. 18, 2005

(30) Foreign Application Priority Data

Feb. 16, 2004  (JP) .............................. 2004-038040

(51) Int. Cl.
*G11B 17/02* (2006.01)

(52) U.S. Cl. .................................................. 360/99.12

(58) Field of Classification Search ............... 360/99.12, 360/99.05
See application file for complete search history.

(56) References Cited

U.S. PATENT DOCUMENTS

| | | | | | |
|---|---|---|---|---|---|
| 4,890,175 | A | * | 12/1989 | Tezuka ..................... | 360/97.01 |
| 4,945,432 | A | * | 7/1990 | Matsudaira et al. ...... | 360/98.02 |
| 5,422,768 | A | * | 6/1995 | Roehling et al. ......... | 360/98.08 |
| 5,459,627 | A | * | 10/1995 | Peter ........................ | 360/98.08 |
| 5,493,462 | A | * | 2/1996 | Peter ........................ | 360/99.12 |
| 5,886,852 | A | * | 3/1999 | Kikuchi et al. ........... | 360/98.08 |
| 6,218,760 | B1 | * | 4/2001 | Sakuragi et al. ......... | 310/254 |
| 6,462,903 | B1 | * | 10/2002 | Yamada et al. .......... | 360/99.12 |
| 6,788,495 | B2 | * | 9/2004 | Aiello ....................... | 360/99.12 |
| 2002/0071206 | A1 | * | 6/2002 | Choo et al. .............. | 360/99.12 |

FOREIGN PATENT DOCUMENTS

| | | | |
|---|---|---|---|
| JP | 62-35446 | * | 3/1987 |
| JP | 62-35446 | U | 3/1987 |
| JP | 01-59977 | U | 4/1989 |
| JP | 06-028752 | | 2/1994 |
| JP | 06-139675 | A | 5/1994 |
| JP | 06-168536 | A | 6/1994 |
| JP | 06168536 | A | * 6/1994 |
| JP | 2001-291301 | | 10/2001 |
| JP | 2003-217249 | A | 7/2003 |

OTHER PUBLICATIONS

Japan Patent Office (JPO) office action dated Jul. 3, 2007 for JPO patent application JP2004-038040.

* cited by examiner

*Primary Examiner*—William R. Korzuch
*Assistant Examiner*—Daniell L Negrón
(74) *Attorney, Agent, or Firm*—Townsend and Townsend and Crew LLP

(57) ABSTRACT

A magnetic disk apparatus capable of reducing deformation of a magnetic disk is disclosed. The magnetic disk apparatus comprises a magnetic disk on which data is recorded while the disk is driven, a hub around which the magnetic disk is supported from an under side of the magnetic disk, and a clamp in contact with the other side of the magnetic disk and fixing the magnetic disk. An O-ring is interposed between a flange formed at an outer circumference of the hub and the magnetic disk, and a spacer is interposed between the magnetic disk and the O-ring. Thus an upper surface of the hub is in contact with an under surface of the clamp and defines a vertical position of the magnetic disk.

8 Claims, 4 Drawing Sheets

MAGNETIC DISK APPARATUS

CLAIM OF PRIORITY

The present application claims priority from Japanese application serial JP 2004-038040 filed on Feb. 16, 2004, the content of which is hereby incorporated by reference into this application.

FIELD OF THE INVENTION

The present invention relates to a magnetic disk apparatus, and particularly to a magnetic disk apparatus where a magnetic disk is fixable with less deformation.

BACKGROUND OF THE INVENTION

A method of fixing a magnetic disk in a disk apparatus has been disclosed in Japanese Patent Laid-Open No. 2001-291301, for instance, where an upper surface of a flange which is formed at a lower side of a hub constitutes an annular disk support on which magnetic disks and a spacer are alternately superposed, with a clamp disposed on top, and a clamp screw is tightened so that the clamp is deformed by an applied tightening force, imposing a clamping force on the magnetic disk to thereby fix the magnetic disk.

It is also known that in the above-described structure an elastic member having a large coefficient of friction, such as one made of polyurethane rubber, is interposed between the magnetic disk and the spacer, as disclosed in Japanese Patent Laid-Open No. H6(1994)-28752, for instance. [Patent Document 1] Japanese Patent Laid-Open No. 2001-291301 [Patent Document 2] Japanese Patent Laid-Open No. H6(1994)-28752

SUMMARY OF THE INVENTION

However, a clamp such as that described in the Japanese Patent Laid-Open No. 2001-291301 is commonly produced by sheet metal working which can not assure high precision of the finished products, and causes a bias in distribution of load in a plane of a contact surface of the clamp with the magnetic disk. Thus the magnetic disk undesirably deforms.

Further, in the arrangement described in the Japanese Patent Laid-Open No. H6(1994)-28752 where an elastic member is interposed between the magnetic disk and the spacer, the elastic member directly contacts the magnetic disk. Generally, an elastic member is difficult to be produced with high precision, and causes the undesirable deformation of the magnetic disk.

Recently, magnetic disk apparatuses are increasingly reduced in size and enhanced in capacity. Regarding the size reduction, magnetic disk apparatuses of 1.8- and 1-inch disk have recently become commonplace. For instance, the maximum capacity of a 1-inch magnetic disk apparatus is presently 4 GB. Since the adverse effect of deformation of the disk is serious for disks having a capacity of 4 GB or more, e.g. 6 GB and 8 GB, in order to further increase the capacity of the magnet disk, it is required not only to increase the capacity per unit area but also make it possible to record data on the more inner part of the disk. For instance, on a 1-inch magnetic disk having a capacity of 4 GB or more, the innermost position where data is recordable is about 7 mm distant from the center of the disk. On the other hand, write errors due to deformation of the magnetic disk increase in inverse proportion to the square of the radius of the magnetic disk. Therefore it is necessitated to minimize the deformation of the disk to achieve the size reduction and capacity enhancement of the magnetic disk apparatus.

An object of the invention is to provide a magnetic disk apparatus capable of reducing deformation of a magnetic disk.

(1) To attain the above object, the invention provides a magnetic disk apparatus comprising: a magnetic disk on which data is recorded while the magnetic disk is driven; a hub supporting the magnetic disk there around rotatably; a clamp which hold the magnetic disk in contact therewith; a magnetic head for recording data on and replaying the data from the magnetic disk while the magnetic disk is rotated; an elastic member interposed between a flange portion provided at a peripheral portion of the hub and the magnetic disk and composed of a material having a rigidity lower than that of the clamp; and a spacer interposed between the elastic member and the magnetic disk; wherein the clamp is pressed against the hub to establish vertical position of the magnetic disk.

According to this arrangement, deformation of the magnetic disk is reduced.

(2) To attain the object, the invention also provides a magnetic disk apparatus comprising: a magnetic disk on which data is recorded while the magnetic disk is driven; a hub supporting the magnetic disk there around rotatably; a clamp which hold the magnetic disk in contact therewith; a magnetic head for recording data on and replaying the data from the magnetic disk while the magnetic disk is rotated; an annular rotor magnet disposed on and around a circumferential surface of the hub; an elastic member interposed between the rotor magnet and the magnetic disk and composed of a material having a rigidity lower than that of the clamp; and a spacer interposed between the elastic member and the magnetic disk; wherein the clamp is pressed against the hub to establish vertical position of the magnetic disk.

According to this arrangement, deformation of the magnetic disk is reduced.

(3) In the magnetic disk apparatus of the arrangement (1) or (2), it is preferable that at least one of a disk contact surface of the clamp and a disk contact surface of the spacer has a shape protruding toward the magnetic disk.

(4) In the magnetic disk apparatus of the arrangement (1) or (2), it is preferable at least one of a disk contact surface of the clamp and a disk contact surface of the spacer has a flatness higher than that of a corresponding one of the contact portions of the magnetic disk.

(5) In the magnetic disk apparatus of the arrangement (1) or (2), it is preferable that an inner diameter of the elastic member as being neither stretched nor compressed is not larger than an outer diameter of a part of the hub on and around which the elastic member is disposed.

(6) In the magnetic disk apparatus of the arrangement (1) or (2), it is preferable that at least one of a disk contact surface of the clamp and a disk contact surface of the spacer has a low surface roughness equal to that of a corresponding one of the contact portions of the-magnetic disk and sticks to the magnetic disk.

According to the present invention, deformation of the magnetic disk is reduced.

DETAILED DESCRIPTION OF THE PREFERRED EMBODIMENTS

There will be described a structure of a magnetic disk apparatus according to a first embodiment of the invention, with reference to FIGS. 1-4.

Figure 1:
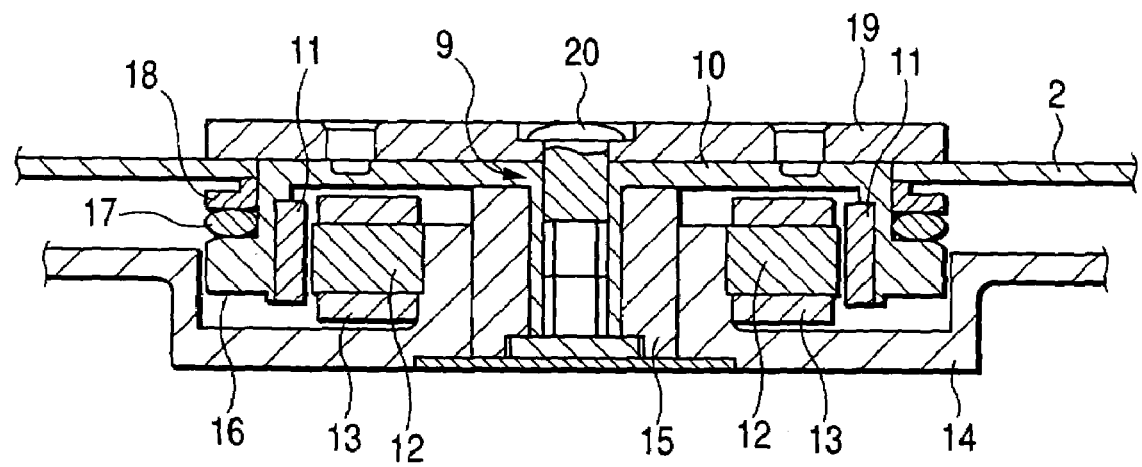
FIG. 1 is a cross-sectional view showing a structure of a spindle motor of a magnetic disk apparatus according to a first embodiment of the invention.
Figure 2:
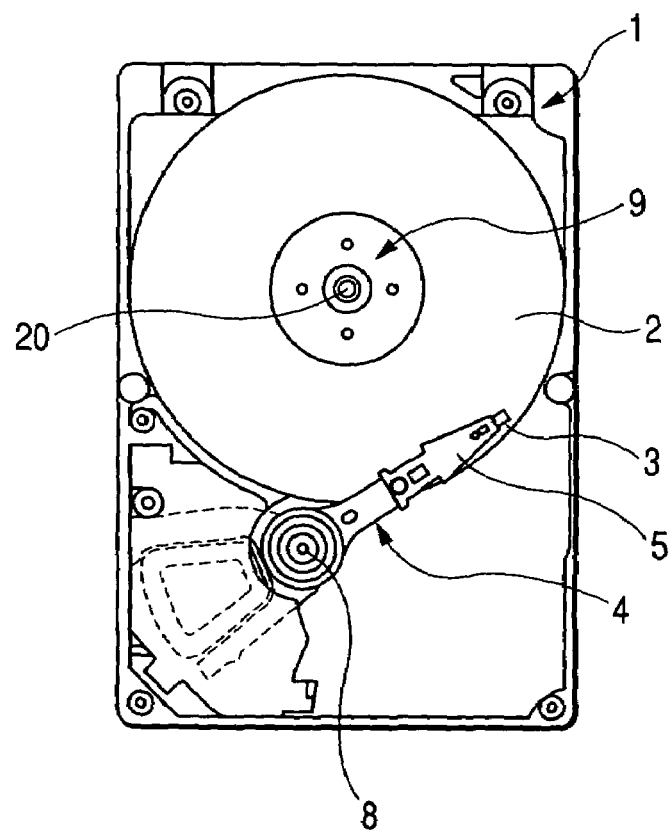
FIG. 2 is a plan view showing a general structure of the magnetic disk apparatus of the first embodiment.
Figure 3:
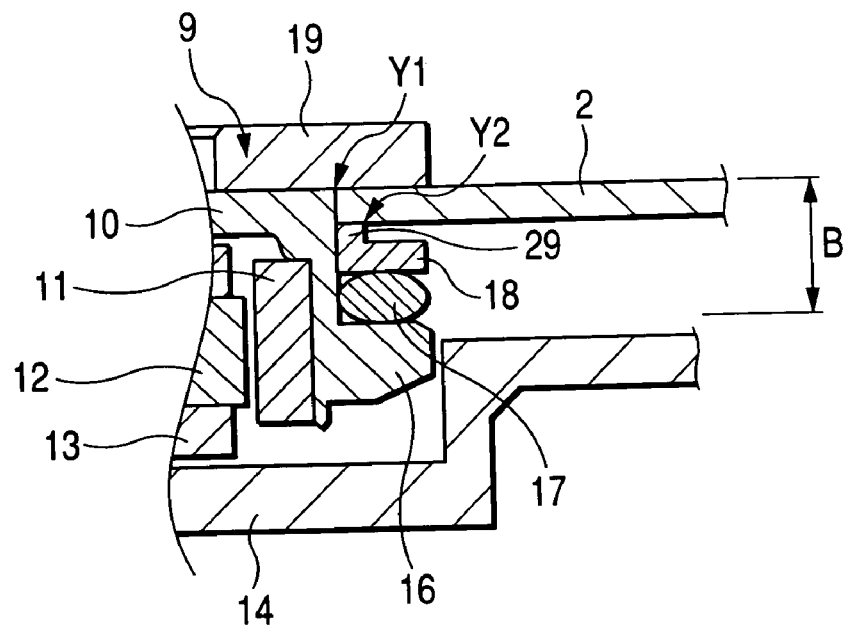
FIG. 3 is a cross-sectional view showing in detail a structure of a disk fixing portion of the magnetic disk apparatus.
Figure 4:
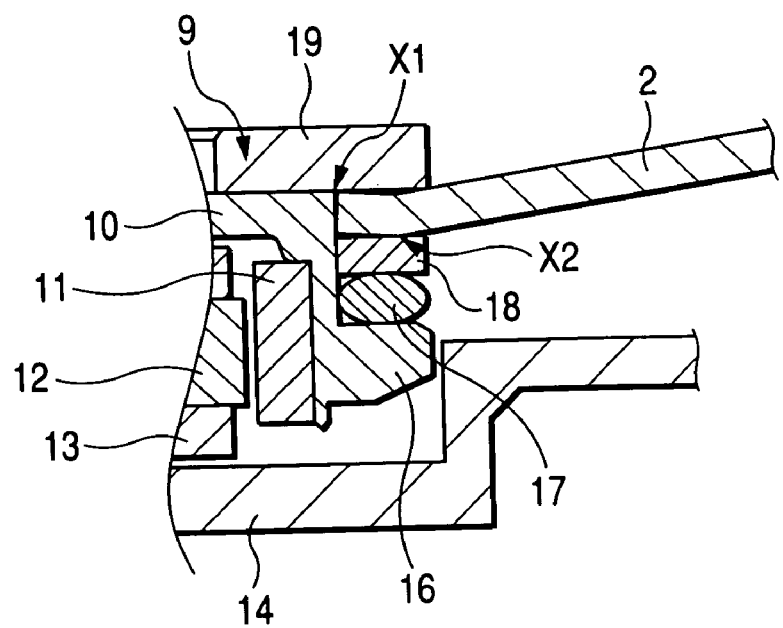
FIG. 4 is a cross-sectional view showing a disk fixing portion of a magnetic disk apparatus as a comparative example.

FIG. 1 is a cross-sectional view showing a structure of a spindle motor in the magnetic disk apparatus according to the first embodiment, and FIG. 2 is a plan view showing a general structure of the magnetic disk apparatus. FIG. 3 is a cross-sectional view showing details of a structure of a disk fixing portion of the magnetic disk apparatus, while FIG. 4 is a cross-sectional view showing a disk fixing portion of a magnetic disk apparatus as a comparative example. In FIGS. 1-4, same reference numerals denote same elements.

Initially, a general structure of the magnetic disk apparatus is described by referring to FIG. 2.

The magnetic disk apparatus 1 has a magnetic disk 2 and a magnetic head 3 for writing and reading data on and from the magnetic disk 2. The magnetic head 3 is opposed to the magnetic disk 2, and, while the magnetic disk 2 is driven or rotated, levitated above the magnetic disk 2 with a slight distance.

A head assembly 4 has an arm 5 holding at its end the magnetic head 3, a pivot 8 around which the arm 5 is pivoted to move in a direction along a radius of the magnetic disk 2.

The magnetic disk 2 is fixed to a spindle motor 9 by a screw 20 to be rotatably supported by the spindle motor 9.

There will be described a structure of the spindle motor 9 by referring to FIG. 1.

The spindle motor 9 has a stator 12 and a rotor magnet 11 which is fixed on an internal side of a generally cylindrical hub 10. A coil 13 is wound around the stator 12. The rotor magnet 11 is opposed to the stator 12. The hub 10 is supported via a slide bearing such that the hub 10 is rotatable relative to a sleeve 15 fixed to a base plate 14. The stator 12 is fixed to the base plate 14. By energizing the coil 13, the hub 10 is driven or rotated.

The magnetic disk 2 is interposed between the clamp 19 and a spacer 18 and an O-ring 17, and fixed to the hub 10 with the screw 20. The O-ring 17 is an elastic member having a rigidity lower than that of the clamp 19. An inner diameter of the O-ring 17 as being neither stretched nor compressed is not larger than an outer diameter of a cylindrical portion of the hub 10. With such a dimension of the O-ring 17, a variation, in a horizontal plane, of an application of a load is reduced. Details of a disk fixing portion where the magnetic disk 2 is fixed will be described later with reference to FIG. 3.

Referring to FIGS. 1 and 2, there will be described an operation of the magnetic disk apparatus 1.

When the magnetic disk apparatus 1 is activated, the spindle motor 9 is driven. The magnetic head 3 at the end of the head assembly 4, which has been held off from above the magnetic disk 2, is moved in the direction of the radius of the magnetic disk 2 with the magnetic head 3 levitated above the magnetic disk 2 by a slight distance. Then, using the magnetic head 3, data is written to or read from a position on the magnetic disk 2 which is designated by a position signal.

When the write of data to or read of data from the magnetic disk 2 is terminated, the spindle motor 9 is stopped, with the magnetic head 3 at the end of the head assembly 4 moved away from above the magnetic disk 2.

There will be next illustrated details of the disk fixing portion, by referring to FIG. 3.

A flange 16 is integrally formed at an outer circumference of the hub 10. Between an under surface of the magnetic disk 2 and an upper surface of the flange 16, the O-ring 17 made of a rubber and the spacer 18 are interposed. The under surface of the magnetic disk 2 contacts an upper end surface of the spacer 18. By driving the screw 20 into a screw hole of the hub 10, the O-ring 17 is deformed and the clamp 19 is fixed with the vertical position of an upper surface of the hub 10 coincident with that of an under surface of the clamp 19.

The clamp 19 and spacer 18 are made of a martensitic stainless steel. Although either glass or aluminum may be employed as the substrate material of the magnetic disk 2, glass is more preferable, since a difference in coefficient of linear thermal expansion between glass and the martensitic stainless steel forming the clamp 19 and spacer 18 that respectively contact the magnetic disk 2 is relatively small.

In the magnetic disk apparatus 1 where the magnetic head 3 at the end of the head assembly 4 is levitated above the magnetic disk 2 by a slight distance, a reference level defining the vertical position of the magnetic disk 2 should be given with high precision. This requirement is met by the arrangement where the vertical position of the magnetic disk 2 is defined by the under surface of the clamp 19 which is fixed with the screw 20 in contact with the upper surface of the hub 10.

A disk contact surface of each of the clamp 19 and spacer 18, at which the clamp 19 and the spacer 18 contacts with the magnetic disk 2, is surface ground so that the flatness thereof is 2 μm or lower. In the present disk fixing method, a direction in which a load is applied on a contact portion in each of upper and under surfaces of the magnetic disk 2 is made perpendicular to the contact portions, making a distribution of the load uniform. Thus deformation of the magnetic disk 2 is inhibited. The method for decreasing the flatness of the disk contact surfaces of the clamp 19 and spacer 18 to 2 μm or lower is not limited to surface grinding, but other methods such as etching may be employed. It is noted, however, that pressing can achieve a flatness of about 30 μm, and lathe turning about 15 μm, at most.

In the technique disclosed in the Japanese Patent Laid-Open No. 2001-291301, the clamp is produced by sheet metal working and therefore its disk contact surface contacting the magnetic disk has a flatness of about 30 μm. Further, since the flange of the hub which contacts the magnetic disk is finished by lathe turning, a flatness of the flange is about 15 μm. When the magnetic disk is fixed using this clamp, with the clamp and the flange having such low flatness, the magnetic disk is deformed to conform to the uneven disk contact surfaces of the clamp and the flange, i.e., adversely affected by the undesirably low flatness of the clamp and the hub or its flange.

On the other hand, in the present embodiment, the flatness of the disk contact surfaces of the clamp 19 and the spacer 18 that contact the magnetic disk 2 is about 2 μm, and therefore the deformation of the magnetic disk 2 due to the low degree of flatness of the disk contact surfaces of the clamp 19 and the spacer 18 is reduced.

Having the flatness of the disk contact surfaces of the clamp 19 and the spacer 18 higher than that of the contact portions of the upper and under surfaces of the magnetic disk 2 improves the flatness of the magnetic disk 2, as well as inhibits the deformation of the magnetic disk 2.

The surface roughness of the disk contact surfaces of the clamp 19 and the spacer 18 is low, namely 5 nm, which is about the same value as of the surface roughness of the contact portions in the upper and under surfaces of the magnetic disk 2. This makes the clamp 19 and the spacer 18, and the magnetic disk 2, stick to each other at the disk contact surfaces, advantageously increasing the clamping force.

In this clamp fixing method, the elastic force of the O-ring 17 as compressed is transmitted to between the magnetic disk 2 and the spacer 18, and between the magnetic disk 2 and the clamp 19, via the spacer 18 and the magnetic disk 2. This elastic force is set such that the magnetic disk 2 is not displaced when a mechanical shock is applied to the magnetic disk apparatus.

Since the thickness of the magnetic disk 2 and the spacer 18, and the thickness of the O-ring 17 as being deformed are determined by a spacing B between the upper surface of the flange 16 and the under surface of the clamp 19, properties of the O-ring 17, such as a cross-sectional diameter, amount of deformation, and hardness thereof, are set so that the load applied on the disk contact surfaces becomes at a value which does not allow displacement of the magnetic disk 2 upon application of a mechanical shock as specified. For instance, in a case where the magnetic disk 2 is of 1-inch and a specified load for inhibiting displacement of the magnetic disk 2 is 4 kg, the O-ring 17 has a cross-sectional diameter of 8 $\phi$, its amount of deformation is 150 µm, and its hardness is 80.

In the arrangement disclosed in the Japanese Patent Laid-Open No. H6(1994) -28752 where the elastic member is sandwiched by and between the clamp and the magnetic disk, the precision in the position of the magnetic disk in the direction along an axis of rotation of the magnetic disk may be deteriorated. In the present embodiment, on the other hand, the magnetic disk is sandwiched by and between the clamp and the spacer, and supported under the elastic force of the O-ring 17 as an elastic member, thereby improving the precision in the position of the magnetic disk.

In the present embodiment where the spacer 18 is located right above the O-ring 17, when the screw 20 is driven in, the flange 16 of the hub 10 deforms but the disk contact surface of the spacer 18 (or an upper surface of a protrusion 29 of the spacer 18) contacting the magnetic disk 2 is shifted in a direction along an axis of the hub 10 due to the deflection of the O-ring 17. Thus, the under surface of the magnetic disk 2 receives a vertical load uniformly in a plane thereof which is perpendicular to the axis of the hub 10.

In the clamping method disclosed in the Japanese Patent Laid-Open No. 2001-291301, a load for fixing the magnetic disk is generated by the deflection of the clamp upon tightening of the screw, and the load is applied on the contact surface of the hub contacting the under surface of the magnetic disk, deforming the flange of the hub. Hence, deformation of the magnetic disk, such as distortion and war page thereof, conforming to the deformation of the flange, occurs.

On the other hand, in the present embodiment, the deflection of the O-ring 17 allows the spacer 18 to shift in the direction along the axis of the hub 10, as described above, and thus the under surface of the magnetic disk 2 receives the vertical load uniformly in its plane perpendicular to the axis of the hub 10. Hence, the deformation of the flange 16 of the hub 10 and accordingly the deformation of the magnetic disk 2 such as distortion and warpage there of are prevented.

According to the technique of the Japanese Patent Laid-Open No. H6(1994)-28752, the under surface of the magnetic disk is in contact with the elastic member, and distribution of a load by deflection of the elastic member is affected by the precision of the elastic member. Thus a variation occurs in distribution of the load, leading to deformation of the disk. On the other hand, in the present embodiment it is the spacer 18 which contacts the magnetic disk, and therefore the variation in distribution of the load is reduced. In addition, the conventional arrangement where the magnetic disk contacts the elastic member is undesirable for a magnetic disk apparatus which is for use over a long period of time. Thus the arrangement of the present embodiment where the elastic member is not in direct contact with the magnetic disk is preferable.

As shown in FIG. 3, an outer diameter of an upper surface of the spacer 18 is smaller than that of an under surface of the spacer 18, that is, the spacer 18 has the protrusion 29. By employing such a spacer 18, the deformation of the disk is reduced.

FIG. 4 shows a comparative example where the disk contact surfaces of the spacer 18 and the clamp 19 are both flat. In this arrangement, when the magnetic disk 2 bends, there is changed a distance, in the axial direction, of a contact position X1 where the upper surface of the magnetic disk 2 and the clamp 19 contact each other, from a contact position X2 where the under surface of the magnetic disk 2 and the spacer 18 contact each other, causing a deformation of the magnetic disk 2. Where the magnetic disk 2 is bent in such a way, the magnetic head 3 may collide with the magnetic disk 2 when moved in the radial direction of the magnetic disk 2, inhibiting read and write of data from and to the magnetic disk 2. In the present embodiment, on the other hand, the spacer 18 has the protruding shape, and thus a contact position Y2 (shown in FIG. 3) where the under surface of the magnetic disk 2 and the spacer 18 contact each other does not change even when the magnetic disk 2 bends, succeeding in reducing the deformation of the disk.

As illustrated above, in this embodiment where the elastic force of the O-ring 17 as compressed via the magnetic disk 2 and the spacer 18 is transmitted to between the magnetic disk 2 and spacer 18 and between the magnetic disk 2 and clamp 19, the deformation of the magnetic disk 2 is reduced, making practicable a magnetic disk apparatus of 1-inch with a capacity of 4 GB or more, for instance.

Further, even when a deformation of the flange 16 of the hub 10 occurs upon tightening of the screw 20, the deflection of the O-ring 17 allows the disk contact surface 29 of the spacer 18 located right above the O-ring 17 to shift in the direction along the axis of the hub 10, and thus the under surface of the magnetic disk 2 receives the vertical load uniformly in its plane perpendicular to the axis of the hub 10. Hence, the deformation of the flange of the hub and accordingly the deformation of the magnetic disk such as distortion and warpage thereof, are prevented.

The disk contact surfaces of the clamp 19 and spacer 18 are surface ground or etched to have a relatively high degree of flatness, so that the load is applied on the contact portions of the upper and under surfaces of the magnetic disk 2 perpendicularly to the planes of the contact portions, enabling a uniform distribution of the load. By enhancing the flatness of the disk contact surfaces of the clamp 19 and spacer 18, the deformation of the magnetic disk 2 due to a low degree of flatness of the disk contact surfaces is reduced, while the flatness of the magnetic disk 2 is improved.

Since the reference level defining the vertical position of the magnetic disk 2 is constituted by the under surface of the clamp 19, the reference level can be set with high precision.

Since the spacer 18 has the protrusion 29, the deformation of the disk is reduced.

Figure 5:
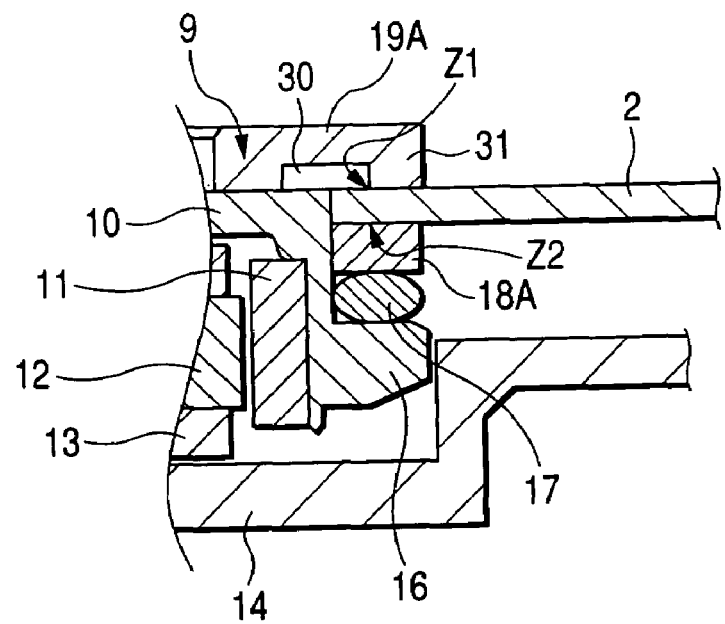
FIG. 5 is a cross-sectional view showing in detail a structure of a disk fixing portion of a magnetic disk apparatus according to a second embodiment of the invention.

There will be next described a structure of a magnetic disk apparatus according to a second embodiment of the invention, by referring to FIG. 5. A general structure of the magnetic disk apparatus is identical with that shown in FIG. 2. A general structure of a spindle motor of the magnetic disk apparatus is identical with that shown in FIG. 1.

FIG. 5 is a cross-sectional view showing details of a disk fixing portion in the magnetic disk apparatus of the second embodiment. Same reference numerals as used in FIGS. 1-3 denote the same elements.

In the second embodiment, a spacer 18A and a clamp 19A which have a different shape from that of the corresponding element shown in FIG. 3 are used. That is, unlike the spacer 18 shown in FIG. 3, the spacer 18A does not have a protrusion 29, but an upper face of the spacer 18A to contact a magnetic disk 2 is flat. On the other hand, the clamp 19A has an annular groove 30 on an inner side of its outer extreme edge, and thus the outer extreme edge constitutes a protrusion 31 which contacts the magnetic disk 2. An inner diameter of the groove 30 is smaller than an inner diameter of the magnetic disk 2, but an outer diameter of the groove 30 is larger than the inner diameter of the magnetic disk 2.

An elastic force of an O-ring 17 deflects the clamp 19A having the protrusion 31, upward by several micrometers. By this deflection, the clamp 19A contacts the magnetic disk 2 at a position Z1 corresponding to an inner circumference of the protrusion 31. That is, a contacting portion of the clamp 19A is annular. By having the position Z1 of the inner circumference of the protrusion 31 coincident with a position Z2, which is a center of moment of the distribution of the load on the under surface of the magnetic disk 2, the warpage of the magnetic disk 2 is prevented.

The magnetic disk apparatus may employ both of the protrusion 29 of the spacer 18 shown in FIG. 3, and the protrusion 31 of the clamp 19A shown in FIG. 5.

According to the second embodiment, the same effects as those of the first embodiment are obtained.

There will be described a structure of a magnetic disk apparatus according to a third embodiment of the invention, by referring to FIG. 6. A general structure of the magnetic disk is identical with that shown in FIG. 2. A general structure of a spindle motor used in the magnetic disk apparatus is identical with that shown in FIG. 1.

Figure 6:
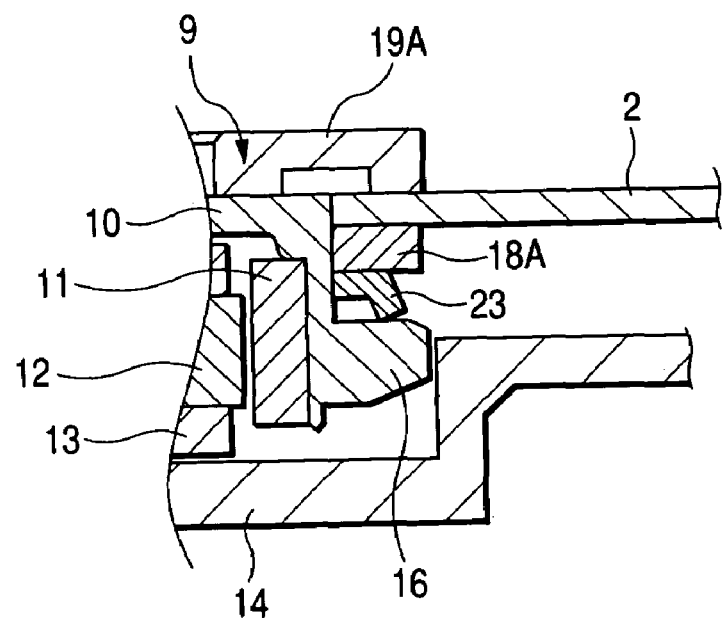
FIG. 6 is a cross-sectional view showing in detail a structure of a disk fixing portion of a magnetic disk apparatus according to a third embodiment of the invention.

FIG. 6 is a cross-sectional view showing details of a disk fixing portion of the magnetic disk apparatus of the third embodiment. Same reference numerals as those used in FIGS. 1-3 and 5 denote the same elements.

In the first and second embodiments shown in FIGS. 3 and 5, the elastic force generated by compressing the O-ring 17 is transmitted to between the magnetic disk 2 and spacer 18 and between the magnetic disk 2 and clamp 19. However, in the third embodiment, a disc spring 23 is used in place of the O-ring 17, and an elastic force generated by compressing the disc spring 23 is utilized. Further, a rubber member having a cylindrical circular conical shape may be used in place of the disc spring 23, to obtain the same effects.

According to the third embodiment, like the above-described first and second embodiments, the load applied on the magnetic disk 2 is uniformly distributed, inhibiting the deformation of the magnetic disk 2. In addition, by having the flatness of the disk contact surfaces of the clamp 19 and spacer 18 higher than that of the magnetic disk 2, the deformation of the magnetic disk 2 is inhibited, and the flatness of the magnetic disk 2 is improved, as well.

There will be described a structure of a magnetic disk apparatus according to a fourth embodiment of the invention, by referring to FIG. 7. A general structure of the magnetic disk is identical with that shown in FIG. 2. A general structure of a spindle motor used in the magnetic disk apparatus is identical with that shown in FIG. 1.

Figure 7:
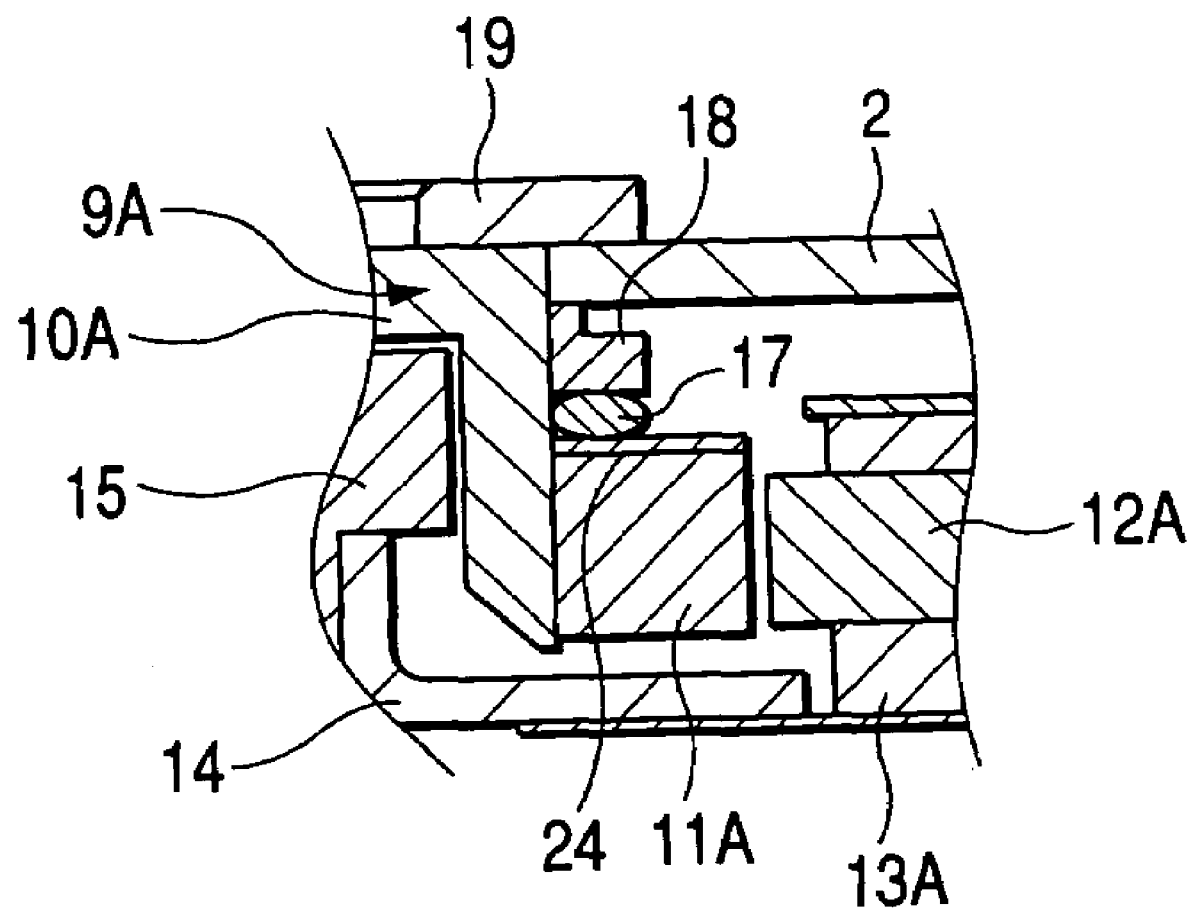
FIG. 7 is a cross-sectional view showing in detail a structure of a disk fixing portion of a magnetic disk apparatus according to a fourth embodiment of the invention.

FIG. 7 is a cross-sectional view showing details of a disk fixing portion of the magnetic disk apparatus of the fourth embodiment. Same reference numerals as those used in FIGS. 1-3 denote the same elements.

In the fourth embodiment, a structure of a spindle motor 9A is different from that of the spindle motor 9 shown in FIG. 3. That is, a rotor magnet 11A is provided on an outer circumferential surface of a hub 10A. When a coil 13A of a stator 12A, which is opposed to the rotor magnet 11A, is energized, the hub 10A is driven or rotated. The hub 10A is supported via a slide bearing such that the hub 10A is rotatable relative to a sleeve 15 fixed to a base plate 14. A magnetic shield 24 is disposed on an upper surface of the rotor magnet 11A so as to prevent an influence of a magnetic field generated by the rotor magnet 11A on the magnetic head 3. Similarly to the first embodiment, an O-ring 17, a spacer 18, and a magnetic disk 2 are disposed on an upper surface of the magnetic shield 24, and a screw 20 is tightened so that a clamp 19 is fixed with its under surface in contact with an upper surface of the hub 10A.

According to the fourth embodiment having the structure as described above, the load applied on the magnetic disk 2 is uniformly distributed, inhibiting the deformation of the magnetic disk 2, like in the first embodiment. Further, by having the flatness of the disk contact surfaces of the clamp 19 and spacer 18 higher than that of the magnetic disk 2, the deformation of the magnetic disk 2 is inhibited, and the flatness of the magnetic disk 2 is improved as well.

What is claimed is:

1. A magnetic disk apparatus comprising:
   a magnetic disk on which data is recorded while the magnetic disk is driven;
   a hub supporting the magnetic disk there around rotatably;
   a clamp which holds the magnetic disk with an annular rotor magnet;
   a magnetic head for recording data on and replaying the data from the magnetic disk while the magnetic disk is rotated;
   the annular rotor magnet disposed on and around an outer circumferential surface of the hub;
   an annular stator disposed around an outer circumferential surface of the annular rotor magnet;
   an elastic member interposed between the annular rotor magnet and an under surface of the magnetic disk and composed of a material having a rigidity lower than that of the clamp; and
   a spacer member separate from the clamp interposed between the elastic member and the under surface of the magnetic disk,
   wherein the clamp is coupled to the hub such that the upper surface of the magnetic disk and an upper surface of the hub are on the same surface.

2. A magnetic disk apparatus comprising:
   a magnetic disk on which data is recorded while the magnetic disk is driven;
   a hub supporting the magnetic disk there around rotatably;
   a clamp which holds the magnetic disk with an annular rotor magnet;

a magnetic head for recording data on and replaying the data from the magnetic disk while the magnetic disk is rotated;

the annular rotor magnet disposed on and around an outer circumferential surface of the hub;

an annular stator disposed around an outer circumferential surface of the annular rotor magnet;

an elastic member interposed between the annular rotor magnet and an under surface of the magnetic disk and composed of a material having a rigidity lower than that of the clamp; and a spacer member separate from the clamp interposed between the elastic member and the under surface of the magnetic disk, wherein the clamp is coupled to the hub such that the upper surface of the magnetic disk and an under surface of the clamp are on the same surface.

3. The magnetic disk apparatus of claim 1 or 2, wherein at least one of a disk contact surface of the clamp and a disk contact surface of the spacer member has a shape protruding toward the magnetic disk.

4. The magnetic disk apparatus of claim 1 or 2, wherein at least one of a disk contact surface of the clamp and a disk contact surface of the spacer member has a flatness higher than that of a corresponding one of the contact portions of the magnetic disk.

5. The magnetic disk apparatus of claim 1 or 2, wherein an inner diameter of the elastics member as being neither stretched nor compressed is not larger than an outer diameter of a part of the hub on and around which the elastic member is disposed.

6. The magnetic disk apparatus of claim 1 or 2, wherein at least one of a disk contact surface of the clamp and a disk contact surface of the spacer member has a lower surface roughness equal to that of a corresponding one of the contact portions of the magnetic disk and sticks to the magnetic disk.

7. The magnetic disk apparatus of claims 1 or 2, wherein the clamp is pressed against the hub to establish vertical position of the magnetic disk.

8. The magnetic disk apparatus of claim 1, wherein the clamp is coupled to the hub such that the upper surface of the hub and an under surface of the clamp are on the same surface.

\* \* \* \* \*